April 8, 1952 — A. ADLER — 2,592,100

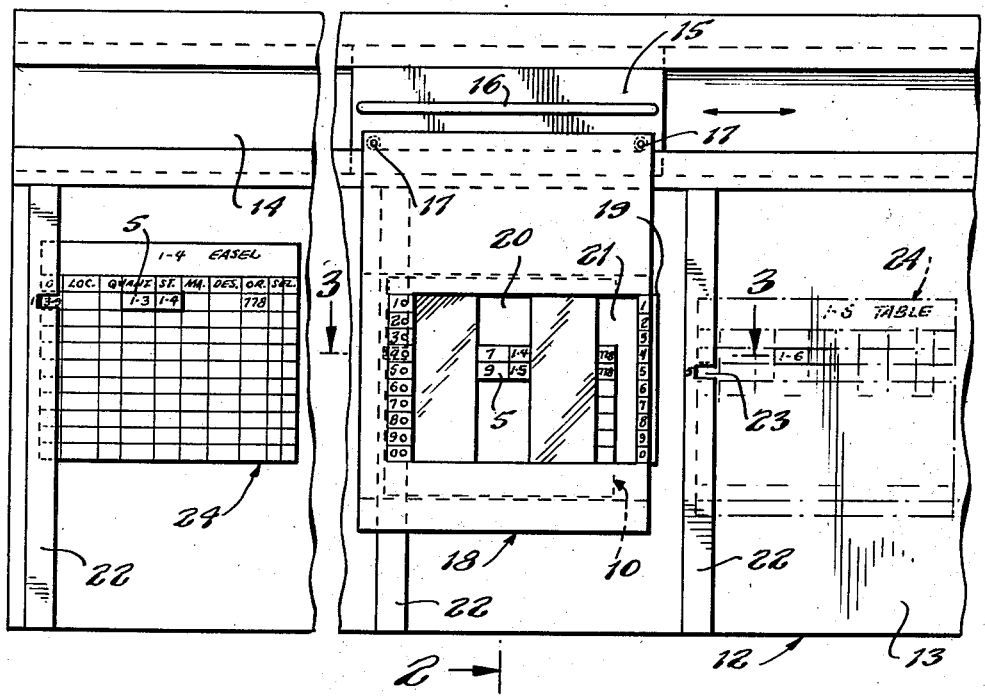
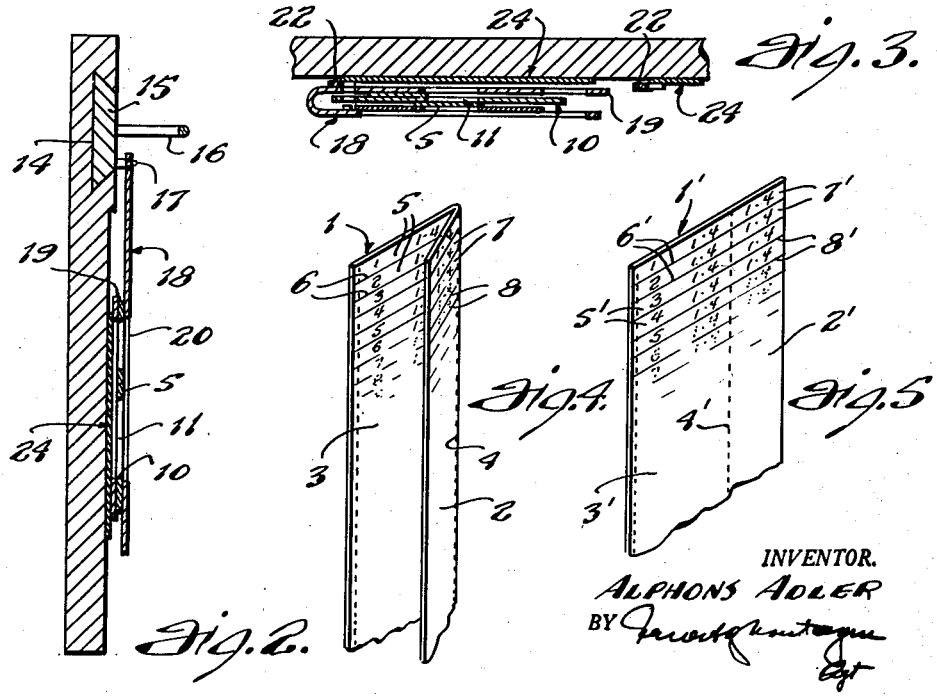

STOCK RECORDING SYSTEM

Filed May 13, 1950 — 2 SHEETS—SHEET 2

INVENTOR.
ALPHONS ADLER
BY

Patented Apr. 8, 1952

2,592,100

UNITED STATES PATENT OFFICE 2,592,100

STOCK RECORDING SYSTEM

Alphons Adler, New York, N. Y.

Application May 13, 1950, Serial No. 161,869

2 Claims. (Cl. 40—19.5)

The present invention relates to a stock recording system which permits of indication of the exact quantity of stock on hand of a plurality of items There are known stock recording systems which are designed for particular fields and are rather of complicated nature or which have loopholes thereby lacking complete control of the stock on hand.

It is, therefore, one object of the present invention, to provide a stock recording system which allows complete control of the stock on hand by recording buying and selling of stock.

It is another object of the present invention to provide an indicating strip disclosing the exact number of units in stock.

It is still another object of the present invention to provide a stock card of each item to which strips indicating the number of units available are applied.

It is yet another object of the present invention to transform from an order slip strips applied thereto to the corresponding stock card.

It is also an object of the present invention to provide a slide supporting the respective stock and moving the order blank to a plurality of succeeding positions in which the order blank overlies the corresponding stock card.

With these and other objects in view, which will become apparent in the following detailed description, the present invention will be clearly understood in connection with the accompanying drawings in which:

Fig. 1 is a plan view of the slide carrying the order blank and the stock cards, respectively;

Fig. 2 is a section along the lines 2—2 of Fig. 1;

Fig. 3 is a section along the lines 3—3 of Fig. 1;

Fig. 4 is a perspective view of a double strip carrying numbers and the item indication;

Fig. 5 is another embodiment of the strip shown in Fig. 4;

Figure 6:
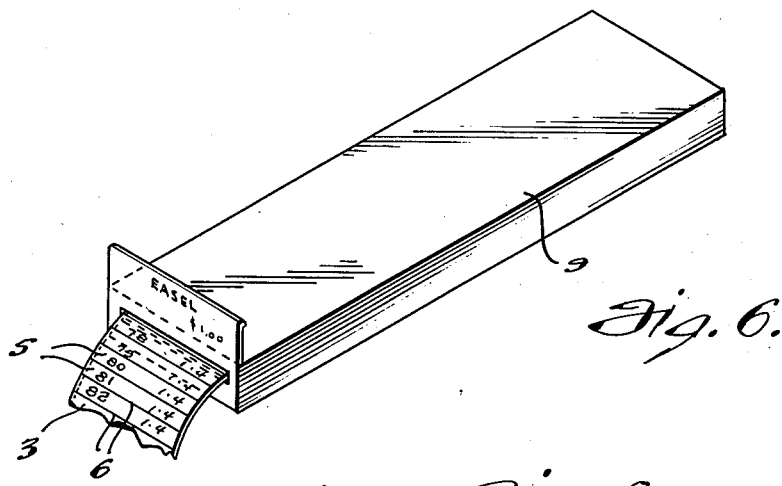
Fig. 6 is a housing for receiving the strip shown in Fig. 4.

Referring now to the drawings, the stock recording system is essentially a method of transforming a label which may be torn off from a strip containing a plurality of labels by means of an order blank to the particular stock card set up for the item. Thus no writing or transcripting takes place and thereby a source for errors in taking down the number of units which has been removed of a particular item or errors in the item number are completely eliminated. The feature of eliminating of any writing regarding the number of units removed and of the item number amounts to an essential advantage over known methods.

At first a strip of labels 1, as shown in Fig. 4, is prepared, which strip 1 is folded over longitudinally and the top portion 2 is disposed over the bottom portion 3. The top portion 2 has a perforation line 4 which permits easy separation of the top portion 2 from the bottom portion 3. Each one of the portions consists of a plurality of labels and the labels 5 of the bottom portion 3 carry a successive number on the left side and the item number for instance 1—4 (Fig. 4) on its right side. Each one of the labels 5 is separated by a perforation line 6 from its adjacent label, and thus makes the removal of each of the labels 5 easy. The top portion 2 likewise consists of a plurality of labels 7 which carry merely the item number, as 1—4, and each label 7 is separated by a perforation line 8.

Figure 8:
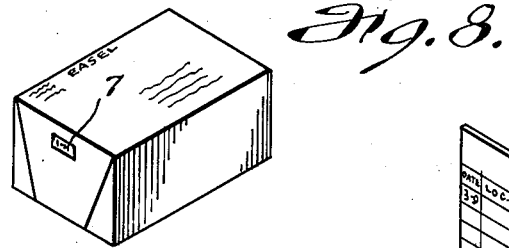
Fig. 8 is the packed up merchandise carrying the item number.

Upon tearing off the top portion 2, each label 7 is torn off and attached to the item (Fig. 8). The bottom portion 3 which has a perforation line 4, also adjacent its left margin, is inserted into a container 9 in such manner that the end carrying the highest number extends outside of the container 9.

The embodiment shown in Fig. 5 is substantially identical with that of Fig. 4, however, instead of disposing the strip portions 2, 3 in Fig. 4 one on the other, in Fig. 5 the two strip portions $2^1$ and 3 are arranged next to each other and also separable by means of a perforation line $4^1$.

An order blank 10 (Fig. 7) from which any order is filled, contains the name of the customer in usual manner and has preferably the following columns: In the first column the successive number by example 1 to 10 is provided to indicate the number of items ordered. In the second column the stock number, as 1—4 of the item purchased, is inserted. In the third column the quantity of each item bought is given. Either the original order blank or preferably a copy thereof is equipped with a window 11 which represents a column containing the item, which has been ordered, written out and the window may be opened for a purpose to be described later. The next column shows the location number of the stock and the last column the order number as for instance 778.

Figure 7:
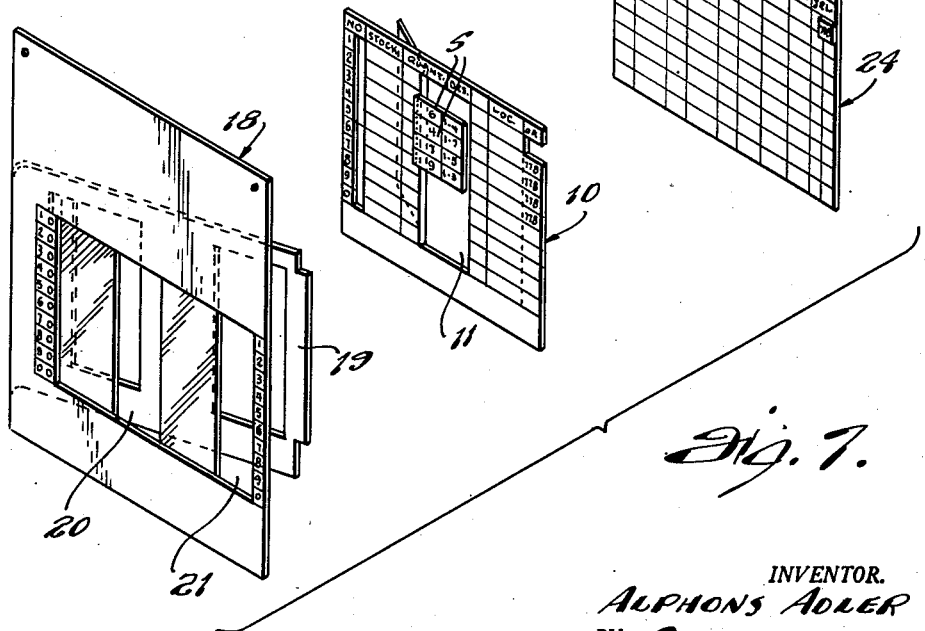
Fig. 7 is a perspective exploded view disclosing the relative arrangement of the sliding frame, the order blank, and the stock card.

If now for instance three units for a certain item are removed from stock to fill the order, three labels are removed from the container 9 and the one carrying the lowest number is pasted to the order blank with its left margin, the length of the label being identical with the width of the window. The label bearing the lowest of the successive numbers is separated from the two labels bearing higher numbers and the latter either destroyed or better inserted into a locked box for later control if required. The mentioned order number in the last column of the order blank is perforated and separable therefrom, as indicated in Fig. 7 by perforation line. In addition, perforation lines are provided between each pair of adjacent order number labels.

If a second item appears on the order blank 10, the desired units of this second item are removed from the stock and the corresponding number of labels are again removed from the coordinated container No. 9 and the one carrying the lowest number is pasted just with its left margin to the following line in the order blank. If more orders appear in the order blank, the same procedure is continued and in Fig. 7 the order blank 10 shows 4 different items having stock numbers 1—4, 1—7, 1—5, and 1—3.

In order to record the item and the number thereof, a sliding device 12 is provided which device may be manually or electrically operated in such manner that a slide moves along the device from one predetermined position to the next upon closing a circuit.

As shown in Figs. 1 to 3, the manually operated sliding device in its simplest form comprises a board 13, which has a longitudinal slot 14 in which a member 15 slides in longitudinal direction.

The member 15 is equipped with a handle 16 and has two longitudinally spaced pins 17 which are adapted to receive a frame 18. The latter carries a back support 19 which is hinged thereto. The support 18 has two windows 20, 21 and the order blank 10 is inserted into the frame 18 on top of the back support 19. The board 13 has a plurality of crosswise disposed bars 22 which are longitudinally spaced apart. The bars 22 have cutouts 23 and cutout of each bar 22 is lowered for one line compared with that of the previous bar. Further the cutouts are numbered consecutively starting with 1 on the first bar and so forth to the last bar.

The bars 22 are adapted to receive a stock card 24 which in the first column carries the date, in the second column the location of the goods in stock, in the third column the quantity and the stock number, then the next column contains the manufacturer's number and the last column the price.

The stock cards 24 of the different items are positioned in the board 13 in such manner that the first empty line thereon is set aligned with the slot having index 1, the next card is set with the first empty line with the index 2 and so forth, by example, if five items are on the order the fifth stock card has the empty line aligned with the cutout having index 5 (see Fig. 1).

The frame is moved at first to the first position and the labels of the first item on the order blank are torn off and, since on its back an adhesive is applied, then pressed down on the empty line of the first stock card 24 through the windows 20 and 21 of the frame. Then the frame 18 is moved sidewardly to the second station where the second labels on the order blank are torn off and in the same manner pasted or otherwise attached to the second stock card, and that is repeated until all labels, by example, all five labels of the order blank are transferred to the respective stock cards.

In the same manner as the stock number is pressed down and attached to the stock card 24 through the window 20 of the frame 18, the order number appearing in the last column of the order blank is torn off and attached likewise to stock card 24.

The frame 18 may be equipped with a dating stamp provided for each line so that upon pressing down the date stamp of the corresponding line on the stock card 24 the date is stamped in the first column thereof.

The frame has been disclosed sliding over the stationary board. It is, however, also possible to keep the frame stationary in front of the worker and move the board relative thereto.

While I have disclosed one embodiment of the present invention it is to be understood that this embodiment is given by example only and not in a limiting sense, the scope of the invention being determined by the objects and the claims.

I claim:

1. In a stock recording system a board, a frame longitudinally slidable along the board to a plurality of stations, said frame having a back portion hinged thereto, said frame and said back portion having each at least one window aligned to each other, an order blank adapted to be inserted into the frame on top of its back portion, a number of stations disposed longitudinally along the board, and a stock card set in each of said stations in such manner that the empty line of said stock card appears opposite a marker provided in each station, the markers of each pair of adjacent stations are one line apart in order to set the next empty line of the stock card in the following station one line below the next empty line of the stock card in the prior station, a plurality of stock number labels secured to the order blank adjacent to its open window and each of said labels being attached to the corresponding stock card in the respective stations of the board.

2. The system, as set forth in claim 1, which includes means for moving said frame relative to said board into the respective stations thereof.

ALPHONS ADLER.

REFERENCES CITED

The following references are of record in the file of this patent:

UNITED STATES PATENTS

| Number | Name | Date |
| --- | --- | --- |
| 2,037,192 | Booth | Apr. 14, 1936 |
| 2,096,153 | Weiss | Oct. 19, 1937 |
| 2,511,370 | Pfeiffer | June 13, 1950 |